United States Patent
Bastian et al.

(10) Patent No.: US 8,721,500 B2
(45) Date of Patent: May 13, 2014

(54) METHOD FOR CONTROLLING DECELERATION OF A MOTOR VEHICLE

(75) Inventors: Klaus Bastian, Neuhausen (DE); Martin Roth, Rutesheim (DE)

(73) Assignee: Dr. Ing. H.C. F. Porsche Aktiengesellschaft, Stuttgart (DE)

( * ) Notice: Subject to any disclaimer, the term of this patent is extended or adjusted under 35 U.S.C. 154(b) by 251 days.

(21) Appl. No.: 13/331,273

(22) Filed: Dec. 20, 2011

(65) Prior Publication Data

US 2012/0157262 A1    Jun. 21, 2012

(30) Foreign Application Priority Data

Dec. 21, 2010 (DE) .......................... 10 2010 061 383

(51) Int. Cl.
*B60W 10/02* (2006.01)
*B60W 10/06* (2006.01)

(52) U.S. Cl.
USPC ........................... 477/187; 477/171; 477/205

(58) Field of Classification Search
USPC ................... 477/187, 203, 205, 171
See application file for complete search history.

(56) References Cited

U.S. PATENT DOCUMENTS

| | | | | |
|---|---|---|---|---|
| 2,876,876 A | * | 3/1959 | Cummins | 477/205 |
| 4,253,437 A | * | 3/1981 | Haramoto | 123/325 |
| 5,551,932 A | * | 9/1996 | Ishii et al. | 477/168 |
| 7,840,337 B2 | | 11/2010 | Zillmer et al. | |
| 2003/0004635 A1 | * | 1/2003 | Kamiya et al. | 701/112 |
| 2008/0227589 A1 | | 9/2008 | Zillmer et al. | |

FOREIGN PATENT DOCUMENTS

DE   10 2004 052 786 A1   5/2006
JP            401022641 A  *  1/1989

OTHER PUBLICATIONS

English Translation of Examination Report for Japanese Application No. 2011-277949 (pp. 2-5).

* cited by examiner

*Primary Examiner* — Roger Pang
(74) *Attorney, Agent, or Firm* — RatnerPrestia

(57) ABSTRACT

A method for controlling deceleration of a motor vehicle having an internal combustion engine with an automated clutch, in which method, when a deceleration is present, a deceleration fuel cutoff is carried out in order to generate a drag torque as a drive torque if the engine speed is higher than a deceleration fuel cutoff threshold wherein when a braking request is present, the effect of the engine speed is evaluated, a comparison is carried out between the expected engine speed or the current engine speed and the deceleration fuel cutoff threshold, and the internal combustion engine is adjusted to a deceleration mode or a deceleration fuel mode is maintained only if the expected or current engine speed is higher than the deceleration fuel cutoff threshold.

7 Claims, 1 Drawing Sheet

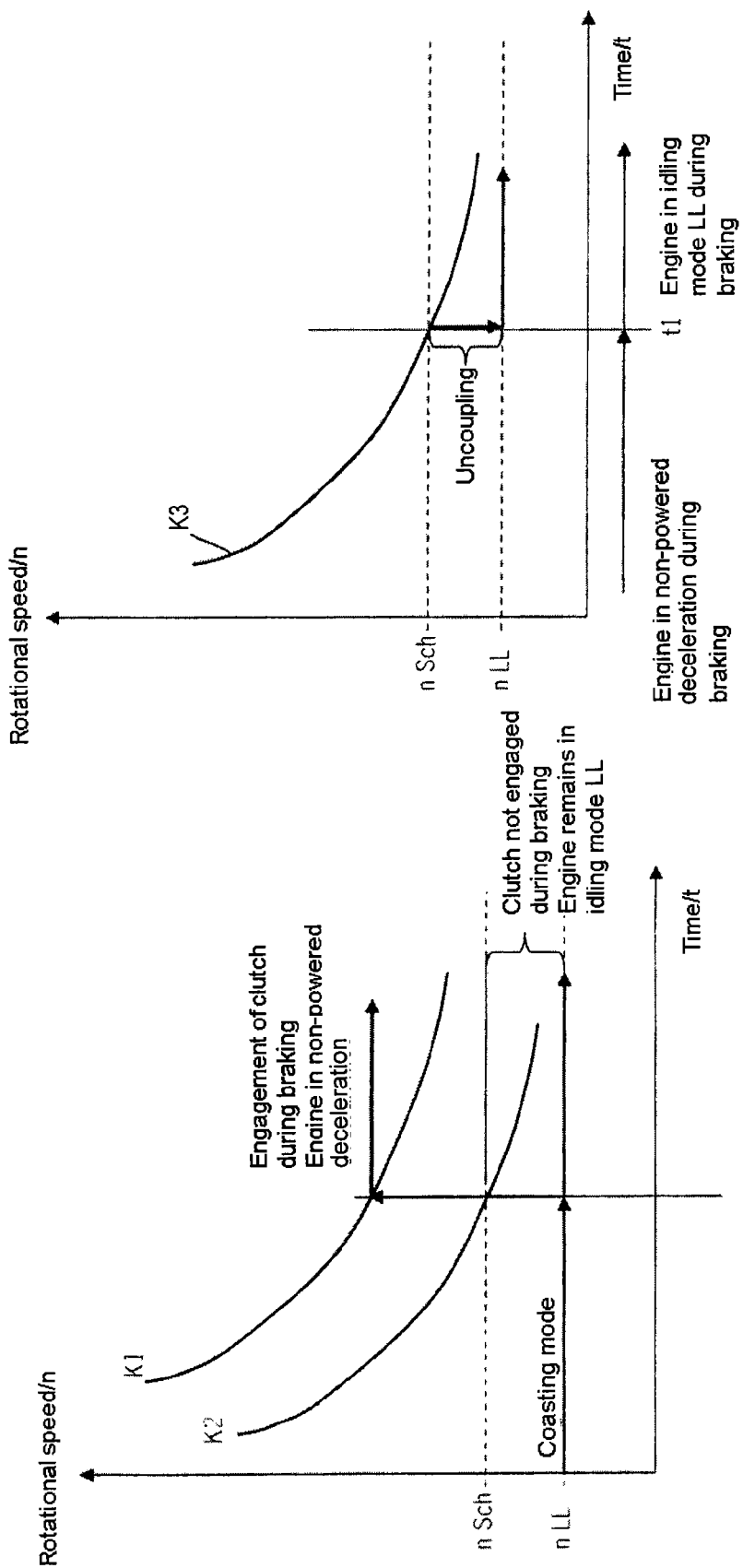

METHOD FOR CONTROLLING DECELERATION OF A MOTOR VEHICLE

CROSS-REFERENCE TO RELATED APPLICATION

This U.S. patent application claims priority to German Patent Application DE 10 2010 061 383.5, filed Dec. 21, 2010, which is incorporated by reference herein in its entirety.

FIELD OF THE INVENTION

The invention relates to a method for controlling deceleration of a motor vehicle having an internal combustion engine with an automated clutch or an automatic transmission, wherein the motor vehicle is also equipped with a deceleration fuel cutoff, in which method, when deceleration is present, a deceleration fuel cutoff is carried out in order to generate a drag torque as a drive torque if the engine speed is higher than a deceleration fuel cutoff threshold ($n_{Sch}$), wherein, when a braking request is present, the engine speed is evaluated and an engine speed which is to be expected on the basis of the braking request is determined; a comparison is carried out between the expected engine speed or the current engine speed and the deceleration fuel cutoff threshold ($n_{Sch}$); and the internal combustion engine is adjusted to deceleration mode or deceleration mode is maintained if the expected or current engine speed is higher than the deceleration fuel cutoff threshold ($n_{Sch}$).

Deceleration mode is an operating state of a motor vehicle in which the accelerator pedal is relieved of loading or is not actuated and, if appropriate, the brake pedal is activated, as a result of which the drag torque of the engine causes braking together with the driving resistance of the vehicle. In this case, in such a deceleration mode the supply of fuel or the injection of fuel is cutoff (deceleration cutoff) if the engine speed is higher than a deceleration fuel cutoff threshold, which is itself higher than the idling speed of the engine. Such a deceleration fuel cutoff can reduce the fuel consumption.

DE 10 2004 052 786 A1, incorporated by reference herein, describes a method for controlling deceleration of a hybrid vehicle having an internal combustion engine and additionally at least one electric motor as well as a deceleration fuel cutoff device. This document states that the overrun switch-on threshold cannot be lowered as desired and typically is at least 300 to 400 $min^{-1}$ above the idling speed. In order to optimize the fuel consumption, it is proposed that when deceleration is present the deceleration fuel cutoff device brings about an interruption in the fuel supply of the internal combustion engine, and when a deceleration cutoff threshold which is at a maximum 200 $min^{-1}$ at least in an operationally warm internal combustion engine is reached or undershot, the fuel supply is restarted. In particular, the torque of the electric motor is used to brake the drop in the rotational speed of the internal combustion engine and to subsequently adjust it to its idling speed. As a result, compared to conventional designs the deceleration phases are to be prolonged, which results in a saving in fuel.

SUMMARY OF THE INVENTION

In view of the above, an object of the invention is that, in order to optimize the fuel supply, a method of the type mentioned at the beginning is developed in such a way that a large saving in fuel can be achieved even without the aid of an electric motor.

This object is achieved by means of a method for controlling deceleration of a motor vehicle having an internal combustion engine with an automated clutch, in which method, when a deceleration is present, a deceleration fuel cutoff is carried out in order to generate a drag torque as a drive torque if the engine speed is higher than a deceleration fuel cutoff threshold (nSch), wherein, when a braking request is present, the engine speed is evaluated and an engine speed which is to be expected on the basis of the braking request is determined; a comparison is carried out between the expected engine speed or the current engine speed and the deceleration fuel cutoff threshold (nSch); and the internal combustion engine is adjusted to a deceleration mode or a deceleration mode is maintained if the expected or current engine speed is higher than the deceleration fuel cutoff threshold (nSch).

In such a method for controlling deceleration of a motor vehicle having an internal combustion engine with an automated clutch, in which method, when deceleration is present, a deceleration fuel cutoff is carried out in order to generate a drag torque as a drive torque if the engine speed is higher than a deceleration fuel cutoff threshold, according to aspects of the invention there is provision that, when a braking request is present, an evaluation of the effect on the engine speed is carried out, in addition a comparison is carried out between the expected engine speed or the current engine speed and the deceleration fuel cutoff threshold, and the internal combustion engine is adjusted to deceleration mode or deceleration mode is maintained only if the expected or current engine speed is higher than the deceleration fuel cutoff threshold.

The method according to aspects of the invention is defined in that the internal combustion engine is not adjusted to the deceleration mode, that is to say the automatic clutch remains open when there is a braking request or an automatic transmission is shifted into the driving stage N or deceleration is ended, that is to say the clutch is automatically opened, if the braking request will lead to undershooting of the deceleration fuel cutoff threshold or the deceleration fuel cutoff threshold is undershot by the engine speed. The result of this is that in spark ignition engines more fuel is consumed to comply with emission requirements in deceleration mode than when the engine speed drops below the deceleration fuel cutoff threshold, than in the idling mode.

In one advantageous refinement of the invention, the vehicle is equipped with an operating mode which permits non-powered travel (coasting mode) and deceleration, and is activated automatically. In this coasting mode, the internal combustion engine is automatically disconnected from the rest of the drive train by means of the automatic clutch, wherein the internal combustion engine continues to run in the idling mode or is switched off. If a braking request occurs in this "coasting" operating mode, according to aspects of the invention a changeover into the operating mode occurs only if the expected engine speed which is determined by evaluating the effect of the braking request on the engine speed is above the deceleration fuel cutoff threshold or deceleration fuel switch-on threshold. If the evaluation leads to a situation in which the expected engine speed will not exceed the deceleration fuel cutoff threshold or deceleration fuel switch-on threshold, the internal combustion engine is not coupled to the drive train, i.e. the clutch remains open, when the braking request is carried out, for example by activating the brake pedal, with the result that the internal combustion engine can continue to run at its idling speed.

According to a further advantageous development of the invention, the evaluation of the effect of the braking request on the engine speed is carried out on the basis of driving state data of the motor vehicle, in particular on the basis of the current engine speed and/or of the vehicle speed and/or of the magnitude of the requested braking torque. For this purpose a control unit, preferably by a transmission control unit, to which the driving state data which are necessary for the evaluation are fed is provided.

For the automated uncoupling of the internal combustion engine from the rest of the drive train in the event of the deceleration fuel cutoff threshold being undershot by the engine speed, an automatic transmission or a double clutch transmission is necessary, or a manual transmission is necessary in addition to the automated clutch.

A coasting mode which can be activated automatically requires an automatic transmission, a double clutch transmission or an automated conventional transmission, wherein, in order to evaluate the braking request, a control unit, preferably a transmission control unit, is provided, to which the driving state data which are necessary for the evaluation are fed.

The invention will be described in detail below on the basis of exemplary embodiments and with reference to the appended Figures, in which:

BRIEF DESCRIPTION OF THE DRAWINGS

FIG. 1 shows a time/rotational speed diagram explaining the method according to aspects of the invention for controlling the deceleration of a motor vehicle with a coasting mode which can be activated, and FIG. 2 shows a further time/rotational speed diagram explaining the method according to aspects of the invention for controlling the deceleration of a motor vehicle.

DETAILED DESCRIPTION OF THE PREFERRED EMBODIMENTS

In a motor vehicle having an internal combustion engine with an automatic transmission, wherein the motor vehicle is also equipped with a deceleration fuel cutoff and a coasting mode which can be activated automatically, this coasting function is expanded with the method according to aspects of the invention which is explained in conjunction with the time/rotational speed diagram according to FIG. 1.

In this diagram in FIG. 1, the engine speed n is illustrated plotted against the time t for two rotational speed profiles K1 and K2. In addition, the idling speed nLL of the internal combustion engine and the deceleration fuel cutoff threshold $n_{Sch}$ are entered in this diagram. If the engine speed n exceeds this deceleration fuel cutoff threshold $n_{Sch}$, a fuel cutoff takes place. If the motor vehicle is in a coasting mode, i.e. the engine is in the idling mode LL and a braking request is generated at the time t1, for example by activating the brake pedal or by a driver assistance system, an evaluation of the effect of this braking request on the engine speed n is carried out by a control unit, for example the transmission control device of the motor vehicle, and a rotational speed which is expected in reaction to this braking request is determined in advance and is compared with the deceleration fuel cutoff threshold $n_{Sch}$. If this expected rotational speed is below this deceleration fuel cutoff threshold $n_{Sch}$ in this context, there is no adjustment to the deceleration mode at the time t1. This means that the internal combustion engine is not coupled to the drive train by means of the automatic clutch. Braking is carried out, as shown by the curve K2 in the diagram according to FIG. 1, without the deceleration mode and the internal combustion engine continues to run essentially at its idling speed nL.

In another case, when the engine speed n which is expected in reaction to the braking request is higher than the deceleration fuel cutoff threshold $n_{Sch}$, there is an adjustment to the deceleration at the time t1, that is to say the internal combustion engine is connected to the drive train with the automatic clutch, wherein at the same time a deceleration fuel cutoff takes place starting from the time t1.

In the diagram according to FIG. 1, the engine speeds of the two curves K1 and K2 drop at the time t1. However, if the method described above is carried out even when the engine speed n drops below the deceleration fuel cutoff threshold $n_{Sch}$ during the coasting mode, the coupling of the internal combustion engine to the drive train in order to use the drag torque thereof initially causes the engine speed n to be increased owing to a high kinetic energy of the vehicle and as a result causes the deceleration fuel cutoff threshold $n_{Sch}$ to be reached, that is to say the expected engine speed n is above this threshold. In this case, the internal combustion engine is adjusted to the deceleration fuel cutoff and at the same time adjusted to the deceleration mode.

In an another case, that is to say when the deceleration fuel cutoff threshold $n_{Sch}$ would not be reached by the engine speed n, that is to say no deceleration fuel cutoff is carried out, when the internal combustion engine is coupled to the drive train, the internal combustion engine is not adjusted to the deceleration mode.

For these cases when, during a coasting mode in which the engine speed is below the deceleration fuel cutoff threshold, in the event of a braking request the effect of the braking request on the engine speed is also checked by a control unit, here for example by a transmission control device, i.e. it is checked whether this braking request, which, for example, requests the drag torque as a braking torque, the engine speed exceeds the deceleration fuel cutoff threshold.

The diagram according to FIG. 2 shows, with the curve K3, comprises a rotational speed profile of an internal combustion engine of a motor vehicle with an automated clutch and a deceleration fuel cutoff device.

If the motor vehicle is in deceleration mode with an engine speed n which is higher than the deceleration fuel cutoff threshold $n_{Sch}$, the internal combustion engine is adjusted to the deceleration. If the engine speed drops below the deceleration fuel cutoff threshold $n_{Sch}$ at the time t1 during the deceleration mode, the internal combustion engine is automatically uncoupled from the drive train, i.e. the clutch is automatically opened, the internal combustion engine continues to run with approximately its idling speed without a deceleration mode. This method can, of course, also be implemented with a motor vehicle which has an automatic transmission.

The evaluation of the effect of the braking request on the engine speed is carried out on the basis of driving state data of the motor vehicle, in particular on the basis of the current engine speed and/or the vehicle speed and/or the magnitude of the requested braking torque, which are fed to the transmission control device.

The invention claimed is:

1. A method for controlling deceleration of a motor vehicle having an internal combustion engine with an automated clutch, an accelerator pedal controlling a fuel supply, and a drive train, in which method, when a deceleration is present in which the accelerator pedal is not actuated and the internal combustion engine is connected to the drive train, a deceleration fuel cutoff for stopping the fuel supply is carried out in order to generate a drag torque as a drive torque if the engine speed is higher than a deceleration fuel cutoff threshold ($n_{Sch}$), wherein, when a braking request actuated by a brake pedal under a condition wherein the internal combustion engine is uncoupled from the drive train is present, the engine speed is evaluated and an expected engine speed on the basis of the braking request under a condition wherein the internal combustion engine is connected to the drive train is determined;

a comparison is carried out between the expected engine speed and the deceleration fuel cutoff threshold ($n_{Sch}$); and the internal combustion engine is adjusted to a deceleration mode or a deceleration mode is maintained if the expected or current engine speed is higher than the deceleration fuel cutoff threshold ($n_{Sch}$), wherein the internal combustion engine is maintained in the condition wherein the internal combustion engine is uncoupled from the drive train if the expected engine speed is lower than the deceleration fuel cutoff threshold ($n_{Sch}$), and wherein after adjustment to the deceleration mode the internal combustion engine is uncoupled from the drive train if the expected engine speed falls below the deceleration fuel cutoff threshold ($n_{Sch}$).

2. The method as claimed in claim 1, wherein the evaluation of the effect of the braking request on the engine speed is carried out on the basis of driving state data of the motor vehicle.

3. The method as claimed in claim 1, wherein the motor vehicle is equipped with a manual transmission.

4. The method as claimed in claim 1, wherein the motor vehicle is equipped with an automated transmission.

5. The method as claimed in claim 1, wherein, in order to evaluate the braking request, a control unit is provided, to which the driving state data which are necessary for the evaluation are fed.

6. The method as claimed in claim 2, wherein the expected engine speed is determined on the basis of the driving state data comprising engine speed and/or vehicle speed and/or magnitude of requested braking torque.

7. The method as claimed in claim 5, wherein the control unit comprises a transmission control unit.

\* \* \* \* \*

UNITED STATES PATENT AND TRADEMARK OFFICE
CERTIFICATE OF CORRECTION

PATENT NO. : 8,721,500 B2
APPLICATION NO. : 13/331273
DATED : May 13, 2014
INVENTOR(S) : Klaus Bastian and Martin Roth It is certified that error appears in the above-identified patent and that said Letters Patent is hereby corrected as shown below:

On the Title Page

Item (73), Assignee, "Dr. Ing. H.C. F. Porsche Aktiengesellschaft"

should read -- Dr. Ing. h.c. F. Porsche Aktiengesellschaft --.

Signed and Sealed this
Seventh Day of October, 2014

Michelle K. Lee
*Deputy Director of the United States Patent and Trademark Office*